United States Patent [19]
Tilman

[11] Patent Number: 6,092,931
[45] Date of Patent: *Jul. 25, 2000

[54] CLOSURE MECHANISM WITH A HEAT-INSULATING LAYER

[75] Inventor: Paul Tilman, Sherwood, Wis.

[73] Assignee: Reynolds Consumer Products, Inc., Appleton, Wis.

[*] Notice: This patent issued on a continued prosecution application filed under 37 CFR 1.53(d), and is subject to the twenty year patent term provisions of 35 U.S.C. 154(a)(2).

[21] Appl. No.: 09/007,934

[22] Filed: Jan. 16, 1998

[51] Int. Cl.⁷ .................................................. B65D 33/24
[52] U.S. Cl. ............................................... 383/63; 24/587
[58] Field of Search .................................. 383/63; 24/587

[56] References Cited

U.S. PATENT DOCUMENTS

| | | |
|---|---|---|
| 3,638,286 | 2/1972 | Eichberg . |
| 4,381,356 | 4/1983 | Marsh . |
| 4,682,366 | 7/1987 | Ausnit et al. . |
| 4,691,373 | 9/1987 | Ausnit . |
| 4,792,240 | 12/1988 | Ausnit . |
| 5,121,997 | 6/1992 | La Pierre et al. ................... 383/63 X |
| 5,242,516 | 9/1993 | Custer et al. ......................... 383/63 X |
| 5,366,294 | 11/1994 | Wirth et al. . |
| 5,415,904 | 5/1995 | Takubo et al. ........................ 383/63 X |
| 5,429,875 | 7/1995 | Okamoto et al. . |
| 5,520,463 | 5/1996 | Tilman . |
| 5,552,202 | 9/1996 | May . |
| 5,628,566 | 5/1997 | Schreiter . |
| 5,655,273 | 8/1997 | Tomic et al. ......................... 383/63 X |
| 5,700,091 | 12/1997 | Tanaka et al. ........................... 383/63 |

FOREIGN PATENT DOCUMENTS

| | | |
|---|---|---|
| 0 371 402 A2 and A3 | 6/1990 | European Pat. Off. . |
| 484599 | 5/1992 | European Pat. Off. ................. 383/63 |
| 6122460 | 5/1994 | Japan ....................................... 383/63 |

*Primary Examiner*—Jes F. Pascua
*Attorney, Agent, or Firm*—Alan M. Biddison

[57] ABSTRACT

A heat insulating layer exists between the attachment layer and the closure profile of a resealable closure mechanism for a package. A heat and pressure sealing process is used to attach the closure profile to a resealable package. A heat-sealing bar is used to apply a heat load into the attachment layer causing the attachment layer to fuse with the film of the package. The beat insulating layer insulates the profile layer from the heat load to prevent distorting or melting of the profile layer. The heat insulating layer also supports the profile members perpendicular to their respective base strips to facilitate opening and closing of the resealable package.

6 Claims, 3 Drawing Sheets

CLOSURE MECHANISM WITH A HEAT-INSULATING LAYER

FIELD OF THE INVENTION

The present invention relates generally to a closure mechanism attached to a package that allows for resealing of the package and, in particular, to closure mechanisms having one or more layers between the closure mechanism and the package.

BACKGROUND OF THE INVENTION

Many packaging applications use resealable containers to store various types of articles and materials. These packages may be used to store and ship food products, non-food consumer goods, printed matter, correspondence, medical supplies, waste materials, and many other articles.

Resealable packages are convenient in that they can be closed and resealed after the initial opening to preserve the enclosed contents. The need to locate a storage container for the unused portion of the products in the package is thus avoided. As such, providing products in resealable packages appreciably enhances the marketability of those products.

A common method of packaging foods, such as sliced luncheon meats and the like, is by use of vertical or horizontal form, fill, and seal procedures. These procedures involve shaping a portion of film ("form"), placing the food article inside or upon the formed film portion ("fill"), completing the closure of the film portion around the food article and "sealing" open edges to complete the packaging process.

The "sealing" stage often involves using a resealable closure mechanism. The resealable closure mechanism is often produced as a separate item from the package and is attached to and made integral with the package at a later point in the manufacturing process by a heat and pressure sealing process. Each separate closure profile includes a base strip and an interlocking member. In some conventional implementations, the closure profiles are formed by two separate extrusions or through two separate openings of a common extrusion die. One closure profile can have a rib or male member and the other a mating groove or female member. The male or female member extends from the front face of the base strip. The rib and groove form a pressure-fastenable and releasable closure mechanism. The back side, or sometimes an extended portion of the front face of the base strip, is sealed to the package film so that the closure mechanism is disposed between the package walls adjacent to the openable side of the package. In some implementations, the packages are made of polymeric materials, since these materials inhibit the migration of air and water from and into the package. The packages can be either flexible or rigid.

Attaching a resealable closure mechanism to the package is fairly straightforward when both the mechanism and the package material are made of compatible materials. Applying heat and pressure in the typical heat-sealing process fuses the mechanism and package together. For example, a resealable polyethylene sandwich bag having a polyethylene closure mechanism can be manufactured in this manner. Alternatively, in some arrangements, the packages and closure mechanisms are made from different materials. For example, packages made from polyester not only protect food from minor air and water losses, but also minimize flavor scalping from the food. However, these polyester packages often have polyethylene or polypropylene closure mechanisms. In such mechanisms, an attachment layer between the closure mechanism and the package is used that adequately bonds to both of the dissimilar materials. Thus, one side of the attachment layer bonds with the material of the closure mechanism, while the other side of the attachment layer bonds with the material of the package. Generally, the attachment layer is coextruded with the closure mechanism so as to bond the attachment layer to the closure mechanism. The difference in the coefficients of thermal expansion render it difficult to coextrude a complete sheet of attachment material with the closure mechanism without causing the closure profile to become distorted after the two pieces are actively or passively cooled.

When attachment layers are used, particular attention is placed on the heat-sealing process. To ensure an adequate bond, the dwell time and temperature of the heating process should cause both sides of the attachment layer to melt and bond with their corresponding parts. Additionally, if the heat-sealing bar applying the heat load into the attachment layer becomes misaligned, the attachment layer might not fully adhere to the closure mechanism or the package. If the heat-sealing process is not performed adequately, the package may leak under the closure mechanism. This defect can enlarge when the consumer separates the male and female closure members to open the closure mechanism. Thus, the bond should be strong enough to resist tearing at this interface.

Another problem encountered when heat-sealing is applied to the attachment layer is heat-related distortion of the underlying profile layer. If the underlying profile layer is severely distorted, the package will not provide a hermetic seal. Furthermore, the profile layer may even melt, preventing the profile from functioning properly.

SUMMARY OF THE INVENTION

Consistent with the present invention, one example embodiment involves a resealable closure profile for use with a resealable package. The resealable closure profile includes a base strip having a front and back side and an interlocking closure member on the front side of the base strip. The resealable closure profile frther includes an attachment layer for bonding the resealable closure profile to the package and a heat insulating layer between the back side of the base strip and the attachment layer. The heat insulating layer is configured so that a package film may be heat-sealed to the back side of the attachment layer by application of heat and pressure without distorting the base strip or the interlocking closure member.

Consistent with another embodiment of the present invention, a resealable package includes film panels sealed to resealable closure profiles located along an edge of the film walls to form the package. The resealable closure profiles include a base strip having a front and back side and an interlocking closure member on the front side of the base strip. The resealable closure profiles further include an attachment layer for bonding the resealable closure profile to the package and a heat insulating layer between the back side of the base strip and the attachment layer. The heat insulating layer is configured so that a package film may be heat-sealed to the back side of the attachment layer by application of heat and pressure without distorting the base strip or the interlocking closure member.

According to another aspect of the present invention, a method of manufacturing a resealable closure profile for use with a resealable package is provided. The method includes extruding a base strip and interlocking closure member from a polymeric resin and coextruding a beat insulating layer and an attachment layer from a polymeric resin.

The above summary of the present invention is not intended to describe each illustrated embodiment or every implementation of the present invention. The figures and the detailed description that follow more particularly exemplify these embodiments.

BRIEF DESCRIPTION OF THE DRAWINGS

The invention may be more completely understood in consideration of the detailed description of various embodiments of the invention that follows in connection with the accompanying drawings in which.

Figure 1:
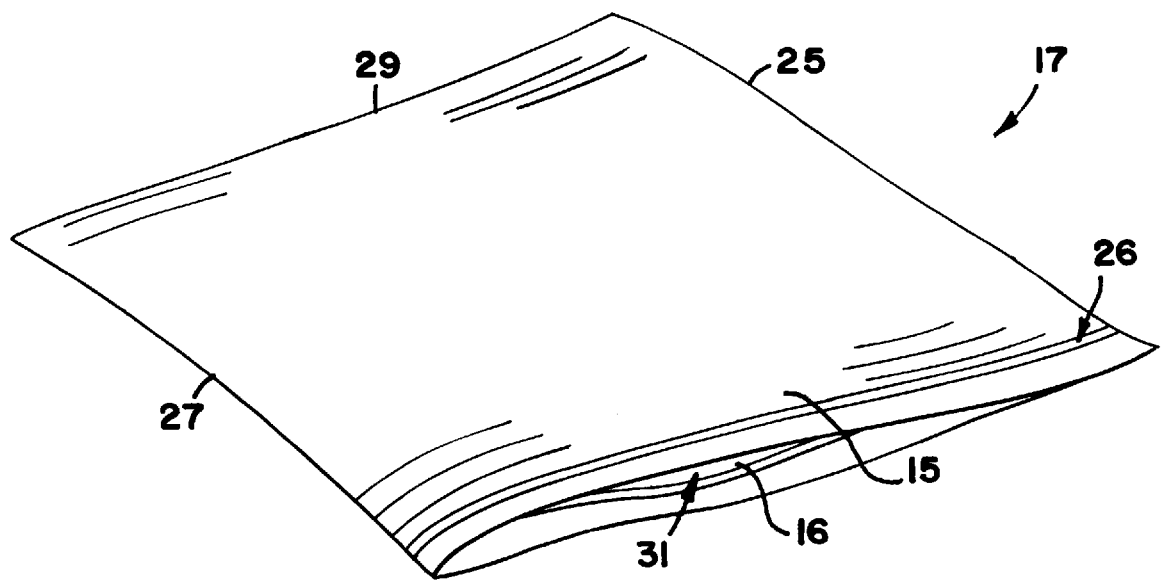
FIG. 1 is a perspective view of a flexible, resealable package according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of flexible, resealable packaging arrangements. The invention has been found to be particularly advantageous for use in sealing mechanisms for resealable polymeric packages. An appreciation of various aspects of the invention can be gained through a discussion of an application example for such a resealable package.

Figure 2:
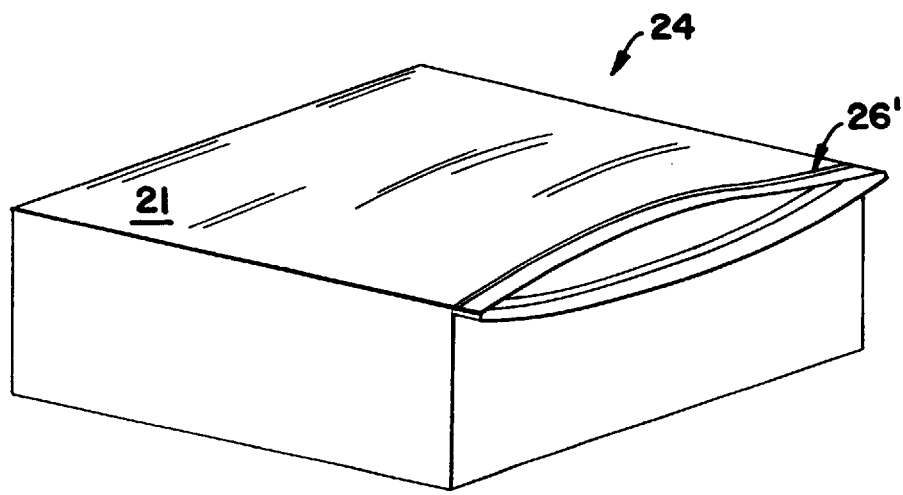
FIG. 2 is a perspective view of a rigid, resealable package according to an example embodiment of the present invention.

According to an example embodiment of the present invention, a resealable package includes resealable closure profiles that are heat-sealed to the package films and an insulating layer that protects the profiles from distortion. FIGS. 1 and 2 illustrate example types of packages 17, 24 that benefit from the use of such closure profiles.

FIG. 1 illustrates an example packaging arrangement in the form of a resealable, flexible package 17 having a zipper-type closure mechanism 26 constructed in accordance with the present invention. The flexible package 17 includes first and second opposed panel sections 15, 16 made from a flexible, polymeric film. For some manufacturing applications, the first and second panel sections 15, 16 are heat-sealed together along two edges and meet at a fold line in order to form a three-edged containment section for a product within the interior of the package 17. The fold line comprises the bottom edge 29. Alternatively, two separate panel sections 15, 16 of polymeric film may be used and heat-sealed together along the two edges 25, 27 and at the bottom 29. Access is provided to the interior of the package 17 through a mouth 31. In other implementations, the package 17 includes tear strings and/or notches at the mouth 31 to assist with opening the package 17.

FIG. 2 is a perspective view depicting a rigid resealable package 24. The rigid resealable package 24 has the same basic features as the flexible resealable package 17 of FIG. 1. The package 24, however, has only one flexible top side 21. The remaining five sides are rigid.

The flexible package 17 and the package 24 may be used to hold a variety of products. Such products may be a variety of edible food products such as cheese, meat, crackers, sugar, powdered sugar, flour, salt, and baking soda, or non-food products such as laundry detergent, sand, printed matter, medical supplies, and other products. Resealable packages are convenient in that they can be closed and resealed after the initial opening to preserve the enclosed contents. The need to locate a storage container for the unused portion of the products in the package is thus avoided. As such, providing products in resealable packages appreciably enhances the marketability of those products.

A resealable closure mechanism 26 is illustrated in FIG. 1 at the opening of the flexible package 17. A similar closure mechanism 26' is illustrated in FIG. 2. Each closure mechanism 26 or 26' extends the width of the package 17 or 24. In the particular embodiment illustrated in FIG. 3, the resealable closure mechanism 26 of FIG. 1 is shown in the specific form of a zipper-type mechanism.

Figure 3:
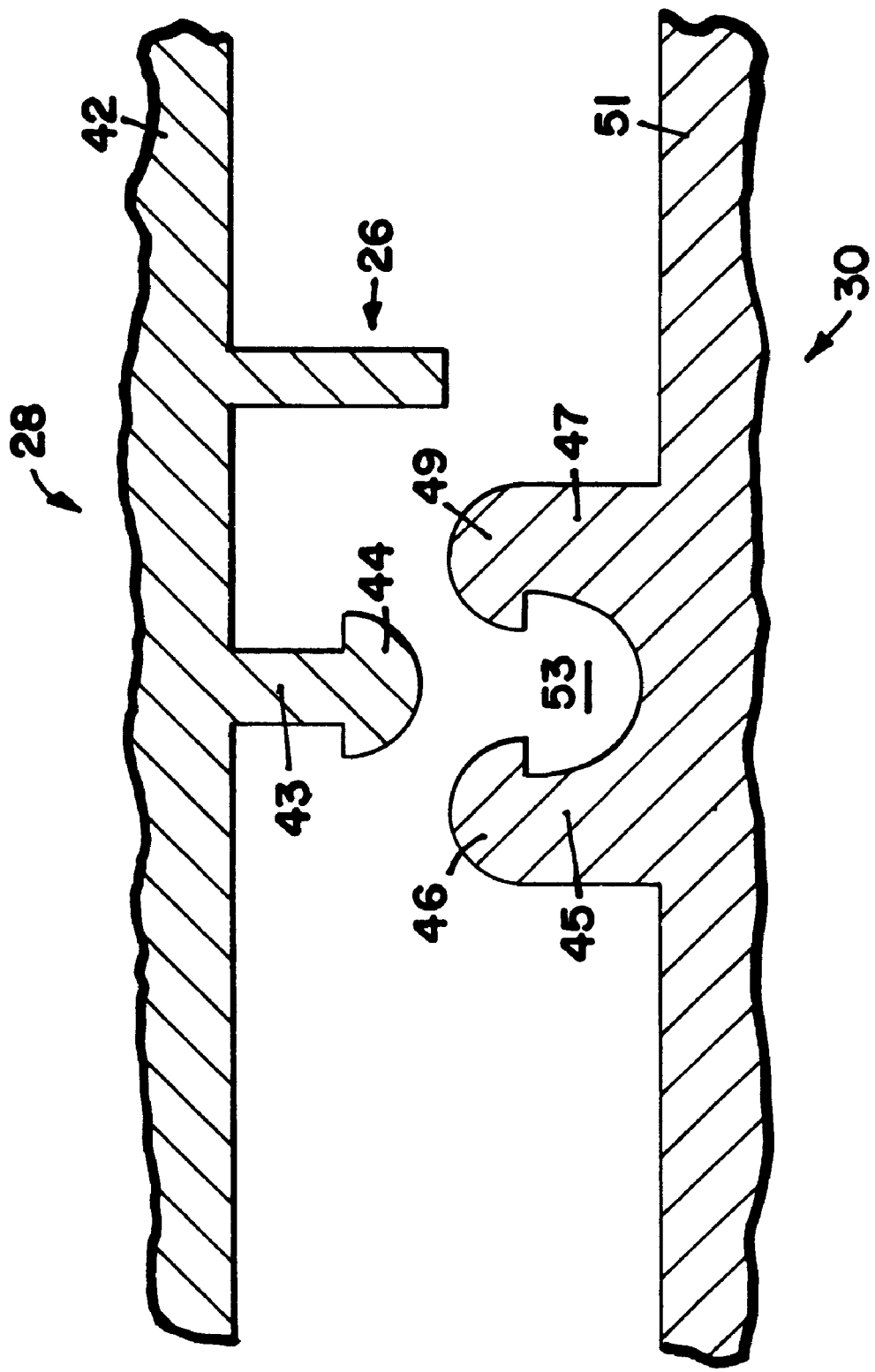
FIG. 3 is an illustration of a particular type of resealable closure mechanism, according to an example embodiment of the present invention, showing its male and female closure profiles.

Referring now to FIG. 3, the resealable closure mechanism 26 is shown in expanded form to include an elongated male closure profile 28 and an elongated female closure profile 30. The male closure profile 28 is comprised of a base strip 42, a rib or male interlocking member 44 at a free end, and a stem 43. The male interlocking member 44 is generally T-shaped. In one embodiment, the base strip 42 is attached to the fist panel section 15 of the flexible package 17 by a beat and pressure seal process.

The female closure profile 30 includes one of many types of interlocking structures for interlocking with the male closure profile 28. This particular example of a locking structure of the female closure profile 30 includes first and second legs 45, 47. The first and second legs 45, 47 have a J-shaped cross section and interlocking members 46, 49. Interlocking members 46, 49 mechanically engage the interlocking member 44 of the male profile 28 in order to reseal the package 17 at the mouth 31. The first and second legs 45, 47 are joined by a common base strip 51 that is attached to the second panel section 16 by, for example, a conventional heat and pressure seal process.

A mating groove 53 functions to contain the interlocking member 44 of the male closure profile 28. When pressure is applied to the closure profiles 28, 30, they engage and form a resealable closure mechanism 26. Pulling the male closure profile 28 and female closure profile 30 away from each other causes the two profiles to disengage, opening the package.

In some applications, the profiles are formed by two separate extrusions or through two separate openings of a common extrusion. Typically, the resealable closure mechanism 26 is made of a flexible polymeric material. Generally, the closure profiles 28, 30 are manufactured separately from the package and are subsequently attached to the package, such as the flexible resealable package 17 of FIG. 1 or the rigid resealable package 24 of FIG. 2, using a conventional heat and pressure seal process.

Figure 4:
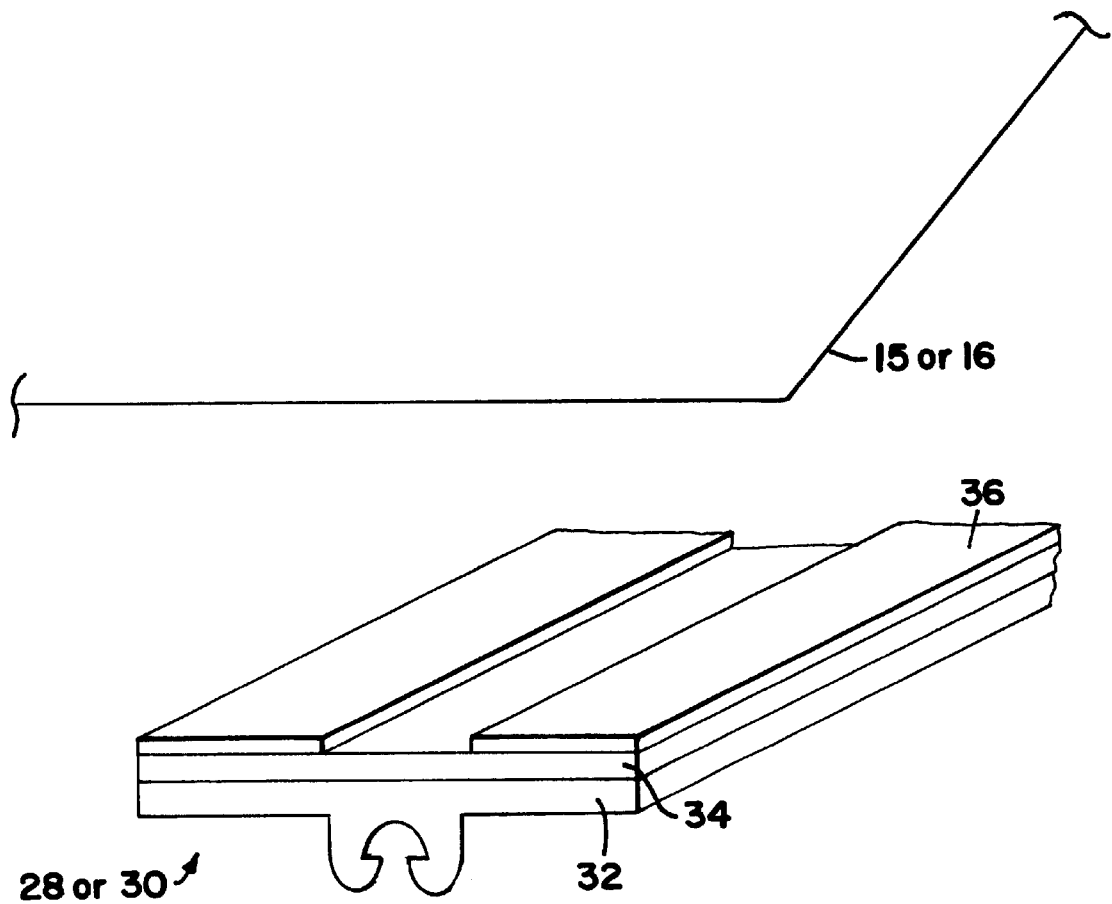
FIG. 4 is a perspective view of a closure profile of a resealable closure mechanism, also according to an example embodiment of the present invention.

FIG. 4 illustrates a perspective view of an example closure profile according to an embodiment of the present invention. The profile layer 32 can be associated with the male closure profile or the female closure profile. Each of the male and female closure profiles has an attachment layer 36 that ensures an adequate bond between the package film 15, 16 and the profile layer 32. The attachment layer 36 is especially advantageous when the package and the resealable closure mechanism 26 are made from dissimilar materials.

The packages can be implemented using different types of materials. One approach includes polyester packages with polyethylene closure mechanisms. In this implementation, the attachment layer 36 between the closure profile 28 (or 30) and the package is advantageous because it bonds sufficiently with the dissimilar polyester material of the package. Each of the closure profiles 28, 30 has a heat barrier. In the embodiment shown in FIG. 4, the heat barrier comprises a heat insulating layer 34 located between the profile layer 32 and the attachment layer 36. The heat insulating layer 34 protects the closure profile from heat-related distortion when heat is applied to the attachment layer 36.

The heat insulating layer 34 and the attachment layer 36 are coextruded with the profile layer such that the heat insulating layer 34 and the attachment layer 36 are bonded to the profile layer 32. Generally, the resealable closure profile 32 (including the base strip) is extruded from a polymeric resin such as polyethylene or polypropylene. The heat insulating layer 34 and the attachment layer 36 are coextruded with the resin of the resealable closure profile 32. The softening point of the resin comprising the heat insulating layer 34 is higher than the softening point of the resin of the coextruded attachment layer 36. In a particular example embodiment, the heat insulating layer 34 is made from a polypropylene resin, which has a relatively high softening point (typical VICAT at 130° C.), and the attachment layer 36 is made from a polyethylene resin, which has a relatively low softening point. For example, the low-density polyethylene resin has a typical VICAT softening point in the range of 85–90° C., and a high-density polyethylene resin has a typical VICAT softening point in the range of 120° C. to 130° C. In other example embodiments, the insulating layer 34 is made from fractional-melt HMW (high molecular weight) polyolefins, or talc-filled compositions of polyolefins.

The resealable closure mechanism is then attached to the package. If both the closure mechanism and the package material are made of compatible materials, the closure mechanism is attached directly to the package by applying heat and pressure in a conventional heat and pressure sealing process. For example, a resealable polyethylene sandwich bag having a polyethylene closure mechanism can be manufactured in this manner. Alternatively, in some arrangements, the packages and resealable closure mechanisms are made from dissimilar materials. in such implementations, an attachment layer 36 between the closure mechanism and the package is used that sufficiently bonds with the material of the package.

A heat and pressure sealing process is used to attach the closure profile 28 or 30 to the package. A heat-sealing bar is used to apply a sufficient heat load into the attachment layer 36 to cause the attachment layer 36 to fuse with the film 15, 16 of the package resulting in an adequate bond between the attachment layer 36 and the package. The heat insulating layer 34 insulates the profile layer 32 from the heat load applied to the attachment layer 36. Insulating the profile layer 32 from the heat load is particularly advantageous because it ensures that the profile layer 32 maintains its shape without distorting or melting. In addition, the heat insulating layer 34 helps support the male and female closure members 28, 30, maintaining them perpendicular to their respective base strips 42, 51. With the closure members 28, 30 perpendicular to the respective base strips 42, 51, opening and closing the resealable package is relatively easy.

The above specification and examples are believed to provide a complete description of the manufacture and use of particular embodiments of the invention. Because many embodiments of the invention can be made without departing from the spirit and scope of the invention, the true scope and spirit of the invention reside in the broad meaning of the claims hereinafter appended.

We claim:

1. A resealable package comprising:
   (a) a package surrounding wall having first and second side edges and a mouth therebetween; said mouth providing access to a package interior;
   (b) a recloseable zipper along said mouth for selective opening and closing of said mouth; said zipper including first and second closure profiles;
      (i) said first closure profile consisting essentially of a base strip, a heat insulating layer, and an attachment layer;
         (A) said base strip having first and second opposite sides, a width, and an interlocking closure member projecting from said first side;
         (B) said heat insulating layer having first and second opposite sides;
            (1) said first side of said heat insulating layer being secured to said second side of said base strip;
            (2) said heat insulating layer being constructed of a material selected from the group consisting of polyethylene, polypropylene, fractional-melt high molecular weight polyolefins, and talc-filled compositions of polyolefins;
            (3) said heat insulating layer extending across the width of the base strip including directly behind said interlocking closure member;
         (C) said attachment layer having first and second opposite sides;
            (1) said first side of said attachment layer being secured to said second side of said heat insulating layer;
            (2) said second side of said attachment layer being secured to said package surrounding wall;
            (3) said attachment layer being constructed of polyethylene having a softening point lower than a softening point of said heat insulating layer; and
            (4) said attachment layer having first and second segments extending across two portions of the width of said base strip with a space therebetween; said space being directly behind said interlocking closure member.

2. A resealable package according to claim 1 wherein:
   (a) said second closure profile consists essentially of a base strip, a heat insulating layer, and an attachment layer;
      (i) said base strip of said second closure profile having first and second opposite sides, a width, and an interlocking closure member projecting from said first side;
      (ii) said heat insulating layer of said second closure profile having first and second opposite sides;
         (A) said first side of said heat insulating layer of said second closure profile being secured to said second side of said base strip of said second closure profile;

(B) said heat insulating layer of said second closure profile being constructed of a material selected from the group consisting of polyethylene, polypropylene, fractional-melt high molecular weight polyolefins, and talc-filled compositions of polyolefins;

(iii) said attachment layer of said second closure profile having first and second opposite sides;

(A) said first side of said attachment layer of said second closure profile being secured to said second side of said heat insulating layer of said second closure profile;

(B) said second side of said attachment layer of said second closure profile being secured to said package surrounding wall;

(C) said attachment layer of said second closure profile being constructed of polyethylene and having a softening point lower than a softening point of said heat insulating layer of said second closure profile; and (D) said attachment layer of said second closure profile having first and second segments extending across two portions of the width of said base strip of said second closure profile with a space therebetween; said space of the attachment layer of the second closure profile being directly behind said interlocking closure member of said second closure profile.

3. A resealable package according to claim 2 wherein:

(a) the softening point of said heat insulating layer of said second closure profile is at least 130° C.; and (b) the softening point of said attachment layer of said second closure profile is about 85–90° C.

4. A resealable package according to claim 2 wherein:

(a) said interlocking closure member of said first closure profile comprises a male closure member.

5. A resealable package according to claim 4 wherein:

(a) said interlocking closure member of said second closure profile comprises a female closure member.

6. A resealable package according to claim 1 wherein:

(a) the softening point of said beat insulating layer of said first closure profile is at least 130° C.; and (b) the softening point of said attachment layer of said first closure profile is about 85–90° C.

* * * * *